(12) United States Patent
Roach et al.

(10) Patent No.: US 10,851,713 B2
(45) Date of Patent: Dec. 1, 2020

(54) ACOUSTIC LINER HAVING INTERNAL STRUCTURE

(71) Applicant: MRA Systems, LLC., Baltimore, MD (US)

(72) Inventors: Andrew Michael Roach, Aberdeen, MD (US); Graham Frank Howarth, Middletown, DE (US)

(73) Assignee: MRA SYSTEMS, LLC., Baltimore, MD (US)

( * ) Notice: Subject to any disclaimer, the term of this patent is extended or adjusted under 35 U.S.C. 154(b) by 354 days.

(21) Appl. No.: 15/689,699

(22) Filed: Aug. 29, 2017

(65) Prior Publication Data

US 2019/0063318 A1 Feb. 28, 2019

(51) Int. Cl.
| | |
|---|---|
| *F02C 7/045* | (2006.01) |
| *B64D 33/02* | (2006.01) |
| *F02K 1/82* | (2006.01) |
| *B64D 29/00* | (2006.01) |
| *E04B 1/84* | (2006.01) |
| *G10K 11/168* | (2006.01) |
| *G10K 11/172* | (2006.01) |

(52) U.S. Cl.
CPC .............. *F02C 7/045* (2013.01); *B64D 29/00* (2013.01); *B64D 33/02* (2013.01); *E04B 1/84* (2013.01); *F02K 1/827* (2013.01); *G10K 11/168* (2013.01); *G10K 11/172* (2013.01); *B64D 2033/0206* (2013.01); *E04B 2001/8428* (2013.01); *F05D 2250/191* (2013.01); *F05D 2260/96* (2013.01)

(58) Field of Classification Search
CPC .. F02C 7/045; F02K 1/827; B64D 2033/0206
USPC .......................................................... 181/292
See application file for complete search history.

(56) References Cited

U.S. PATENT DOCUMENTS

| | | | | | |
|---|---|---|---|---|---|
| 3,734,234 | A | * | 5/1973 | Wirt ........................... | E04B 1/86 181/286 |
| 3,819,007 | A | * | 6/1974 | Wirt ........................... | E04B 1/86 181/286 |
| 3,831,710 | A | * | 8/1974 | Wirt ...................... | G10K 11/172 181/286 |
| 3,887,031 | A | * | 6/1975 | Wirt ........................... | E04B 1/86 181/286 |

(Continued)

FOREIGN PATENT DOCUMENTS

| | | |
|---|---|---|
| EP | 2 960 480 A1 | 12/2015 |
| FR | 2 214 932 A1 | 8/1974 |

(Continued)

OTHER PUBLICATIONS

Extended European Search Report and Opinion issued in connection with corresponding EP Application No. 18190493.9 dated Dec. 10, 2018.

(Continued)

*Primary Examiner* — Jeremy A Luks
(74) *Attorney, Agent, or Firm* — Xsensus LLP (57) ABSTRACT

An acoustic liner can include a support layer with a set of partitioned cavities defining a set of cells with open faces, a first facing sheet operably coupled to the support layer such that the first facing sheet overlies and closes the open faces, and a set of internal separator structures within at least some of the set of partitioned cavities.

20 Claims, 10 Drawing Sheets

(56) References Cited

U.S. PATENT DOCUMENTS

| | | | |
|---|---|---|---|
| 4,106,587 A * | 8/1978 | Nash | F02K 1/827 |
| | | | 181/213 |
| 4,231,447 A * | 11/1980 | Chapman | F01N 1/02 |
| | | | 181/213 |
| 4,829,813 A | 5/1989 | Syed | |
| 5,445,861 A * | 8/1995 | Newton | B32B 3/12 |
| | | | 428/116 |
| 6,447,871 B1 | 9/2002 | Hawkins | |
| 6,615,950 B2 * | 9/2003 | Porte | G10K 11/172 |
| | | | 181/290 |
| 6,830,793 B2 | 12/2004 | Hawkins et al. | |
| 7,565,950 B2 | 7/2009 | Hawkins et al. | |
| 7,661,261 B2 | 2/2010 | Julliard et al. | |
| 8,607,924 B2 * | 12/2013 | Ichihashi | G10K 11/172 |
| | | | 181/288 |
| 8,689,936 B2 * | 4/2014 | Richter | F02K 1/827 |
| | | | 181/284 |
| 8,997,923 B2 * | 4/2015 | Ichihashi | B32B 3/10 |
| | | | 181/292 |
| 9,068,345 B2 * | 6/2015 | Ichihashi | E04B 1/84 |
| 9,290,274 B2 | 3/2016 | Roach et al. | |
| 9,640,164 B2 | 5/2017 | Gerken et al. | |
| 9,643,392 B2 | 5/2017 | Butler et al. | |
| 9,693,166 B2 * | 6/2017 | Herrera | H04R 31/00 |
| 10,280,839 B2 * | 5/2019 | Riou | G10K 11/172 |
| 10,363,726 B2 * | 7/2019 | Butler | B29D 99/0021 |
| 2017/0122341 A1 | 5/2017 | Alonso-Miralles et al. | |
| 2017/0303058 A1 * | 10/2017 | Herrera | H04R 31/00 |

FOREIGN PATENT DOCUMENTS

| | | |
|---|---|---|
| FR | 2 300 384 A1 | 9/1976 |
| FR | 3 026 122 A1 | 3/2016 |
| JP | 49-110112 | 10/1974 |
| JP | 2016-532155 A1 | 10/2016 |
| WO | 2015/023389 A1 | 2/2015 |

OTHER PUBLICATIONS

Japanese Office Action dated Jan. 31, 2020, issued in corresponding Japanese Patent Application No. 2018-156839.

Communication pursuant to Article 94(3) dated Jul. 13, 2020, issued in European Patent Application No. 18 190 493.9.

Office Action dated Sep. 28, 2020, in corresponding Japanese Application No. 2018-156839, 5 pages.

* cited by examiner

ACOUSTIC LINER HAVING INTERNAL STRUCTURE

BACKGROUND

Acoustic attenuation panels can be utilized to reduce noise. For example, aircraft can include acoustic attenuation panels in engine nacelles to reduce noise emissions from turbine engines. Acoustic attenuation panels generally have a sandwich structure that includes sheets enclosing a cellular honeycomb-type inner structure.

BRIEF DESCRIPTION

In one aspect, an acoustic liner includes a support layer having a first side and a spaced second side and where the support layer includes a set of partitioned cavities extending between the first side and the second side, defining a set of cells, and where the set of partitioned cavities have open faces, a first facing sheet operably coupled to the support layer such that the first facing sheet overlies and closes the open faces on the second side, and a set of internal separator structures within at least some of the set of partitioned cavities. A single internal separator structure is located within a single cavity of the set of partitioned cavities, and the single internal separator structure divides the single cavity into a plurality of fluid cavities that are fluidly coupled.

In another aspect, an aircraft engine assembly includes a nacelle configured to surround an aircraft engine and having an inlet section that defines an inlet open to ambient air and where the nacelle at least partially defines an annular airflow path through the aircraft engine assembly, and an acoustic panel operably coupled to at least one of the aircraft engine or the nacelle. The acoustic panel can include a support layer having a first side and a spaced second side and where the support layer includes a set of partitioned cavities extending between the first side and the second side, defining a set of cells, and where the set of partitioned cavities have open faces, a first facing sheet operably coupled to the support layer such that the first facing sheet overlies and closes the open faces on the second side, and a set of internal separator structures within at least some of the set of partitioned cavities. A single internal separator structure is located within a single cavity of the set of partitioned cavities, and the single internal separator structure divides the single cavity into a plurality of fluid cavities that are fluidly coupled.

In yet another aspect, a method of forming a portion of an acoustic liner includes forming a support layer having a first side and a spaced second side and where the support layer includes a set of partitioned cavities extending between the first side and the second side, defining a set of cells, and where the set of partitioned cavities have open faces, separating at least one cavity of the set of partitioned cavities into a plurality of volumes that are fluidly coupled via an internal separator structure within the at least one cavity, and operably coupling a facing sheet to the second side of the support layer such that the facing sheet overlies and closes the open faces on the second side.

DESCRIPTION OF EMBODIMENTS

Aspects of the disclosure relate to acoustic panels. Acoustic panels can be constructed to provide sound absorption or noise reduction in a variety of environments, and typically have physical parameters that can be adjusted to attenuate particular sound frequencies. The acoustic panels will be described herein in the context of an aircraft engine, and it will be understood that acoustic panels can be utilized in a variety of environments such as other mobile, non-mobile, land-based, air-based, or marine applications.

Figure 1:
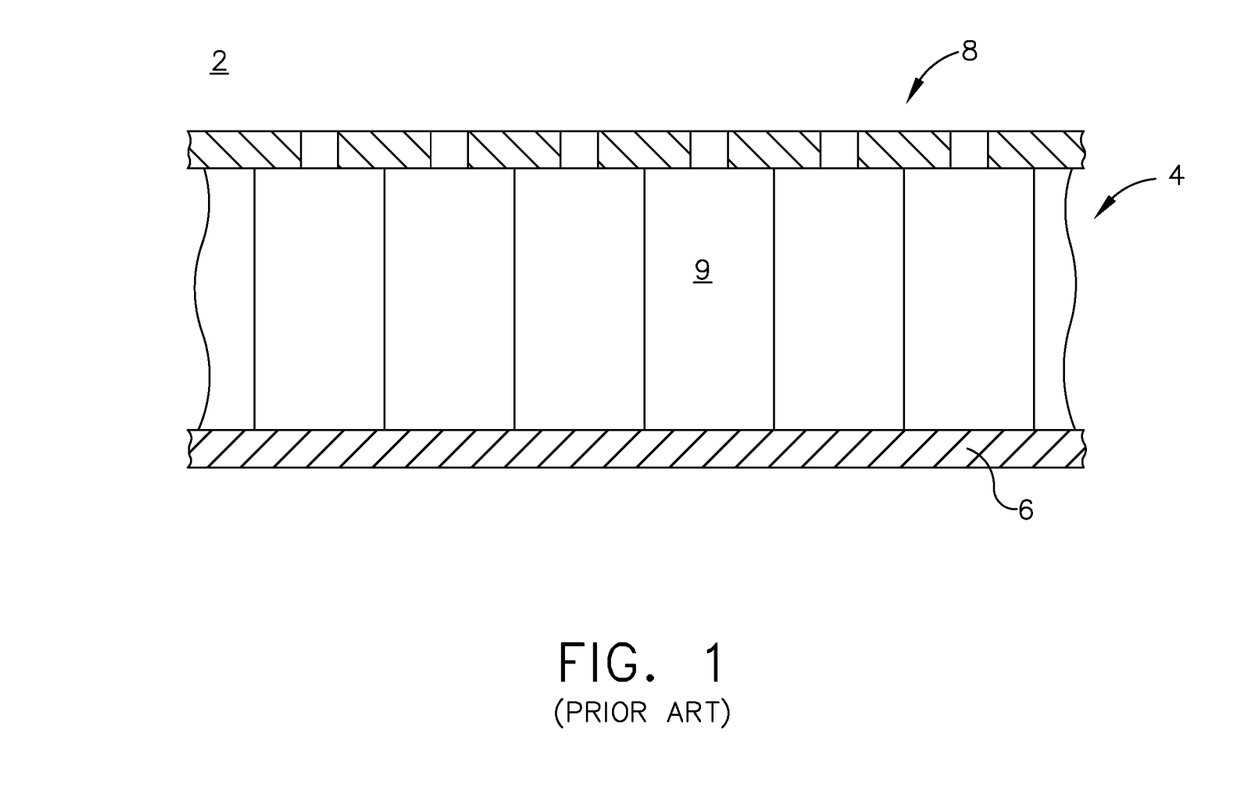
FIG. 1 is a side sectional view of a typical acoustic panel according to the prior art.

Contemporary aircraft engine and nacelle structures typically include acoustic attenuation panels (also called acoustic liners) having a perforated, acoustic facing skin. FIG. 1 shows a cross-sectional view of a typical acoustic panel according to the prior art. The acoustic panel 2 includes an open framework 4 disposed between an imperforate backing sheet 6 and a perforated sheet or facing sheet 8. The open framework 4 forms a support layer having a set of partitioned cavities or cells 9 with open faces. The open framework 4 has open faces on opposing front and rear sides of the open framework 4. In this manner, the open framework 4 forms a set of cells 9 in the open spaces between the open framework 4, the backing sheet 6 and the facing sheet 8.

Figure 2:
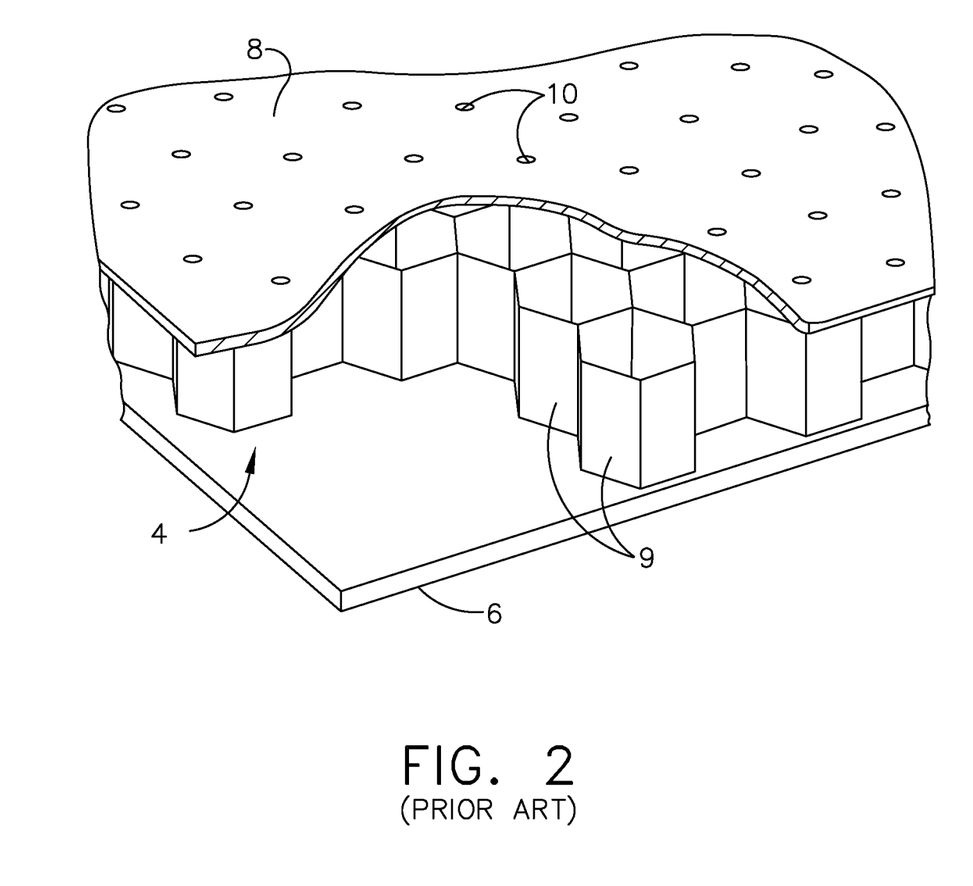
FIG. 2 is a perspective view of the acoustic panel of FIG. 1, according to the prior art, with portions removed for clarity.

As illustrated more clearly in FIG. 2, the cells 9 formed by the open framework 4 are disposed between the backing sheet 6 and the facing sheet 8 each have a predetermined volume defined by the geometry of the open framework 4 and the spacing between the backing sheet 6 and the facing sheet 8. The open framework 4 can include a honeycomb structure wherein the cells have six walls formed by the open framework 4, a bottom wall formed by the backing sheet 6 and a top wall formed by the facing sheet 8. The backing sheet 6 can be impervious with respect to air. More specifically, the backing sheet 6 can be an imperforate sheet supported by the support layer or open framework 4 on an opposite side of the open framework 4 than the facing sheet 8. In this manner, the imperforate sheet is on a back side of the open framework 4 and closes off the open faces on the back side.

The facing sheet 8 can be perforated such that a set of perforations 10, which form inlets, in a predetermined pattern are formed in the facing sheet 8 to allow air into selected cells 9. The facing sheet 8 can be supported by the open framework 4 such that perforations 10 are in overlying relationship with the open faces of the open framework 4 to form paired perforations 10 and cavities that define the acoustic resonator cells 9. The perforated sheet can be directly supported on the open framework 4. Alternatively, an intervening layer can be utilized. The facing sheet 8 can be formed from any suitable material including, but not limited to, a composite material. The perforations 10 can be identical in area or can vary in area in different zones of the perforated sheet. The backing sheet 6 and facing sheet 8 and open framework 4 can be formed such that there are no seams present in backing sheet 6 and facing sheet 8 and open framework 4.

Cells 9 can form a portion of an acoustic resonator. For instance, the area of the perforation 10 and thickness of the facing sheet 8 can define neck portions of the Helmholtz resonators, and the volume of the cells 9 can define the cavity volume. The resonators can be tuned to attenuate predetermined frequencies associated with engine sounds entering the acoustic resonators; tuning can be done by multiple processes well understood by those practiced in the art of acoustic design. The honeycomb cells 9 can be a single layer of hexagonal geometry or multiple layers of the same or different geometry separated by a porous layer, typically identified as a septum. In addition, alternate geometries other than hexagonal can be envisaged including random size cells formed by open cell foams or similar materials.

The acoustic liner generally described above can attenuate only a portion of the broadband noise created by an aircraft engine. With the advent of higher bypass turbofan engines with larger, slower turning fans, the acoustic signature of the aircraft engine assembly has trended towards lower sound frequencies from fan assemblies in addition to higher frequencies from compressor or turbine stages within the engine. Such an aircraft engine assembly creates broadband noise, including multiple frequency peaks. This is against an environment where there is a continued search for improved aircraft and engine performance.

Aspects of the disclosure provide more efficient acoustic panels for broadband attenuation with lower weight and reduced thickness which, in the case of an aircraft engine assembly, can optimize engine installation and reduce overall size and resulting aerodynamic drag. Aspects of the present disclosure, while they can be utilized in any environment will be described herein as being utilized with respect to aircraft engines. As used herein, all directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

As used herein, the term "set" or "a set" of elements can refer to any number of elements, including only one. In addition, the term "broadband noise" will refer to acoustic noise whose energy is distributed over a wide range of frequencies.

Figure 3:
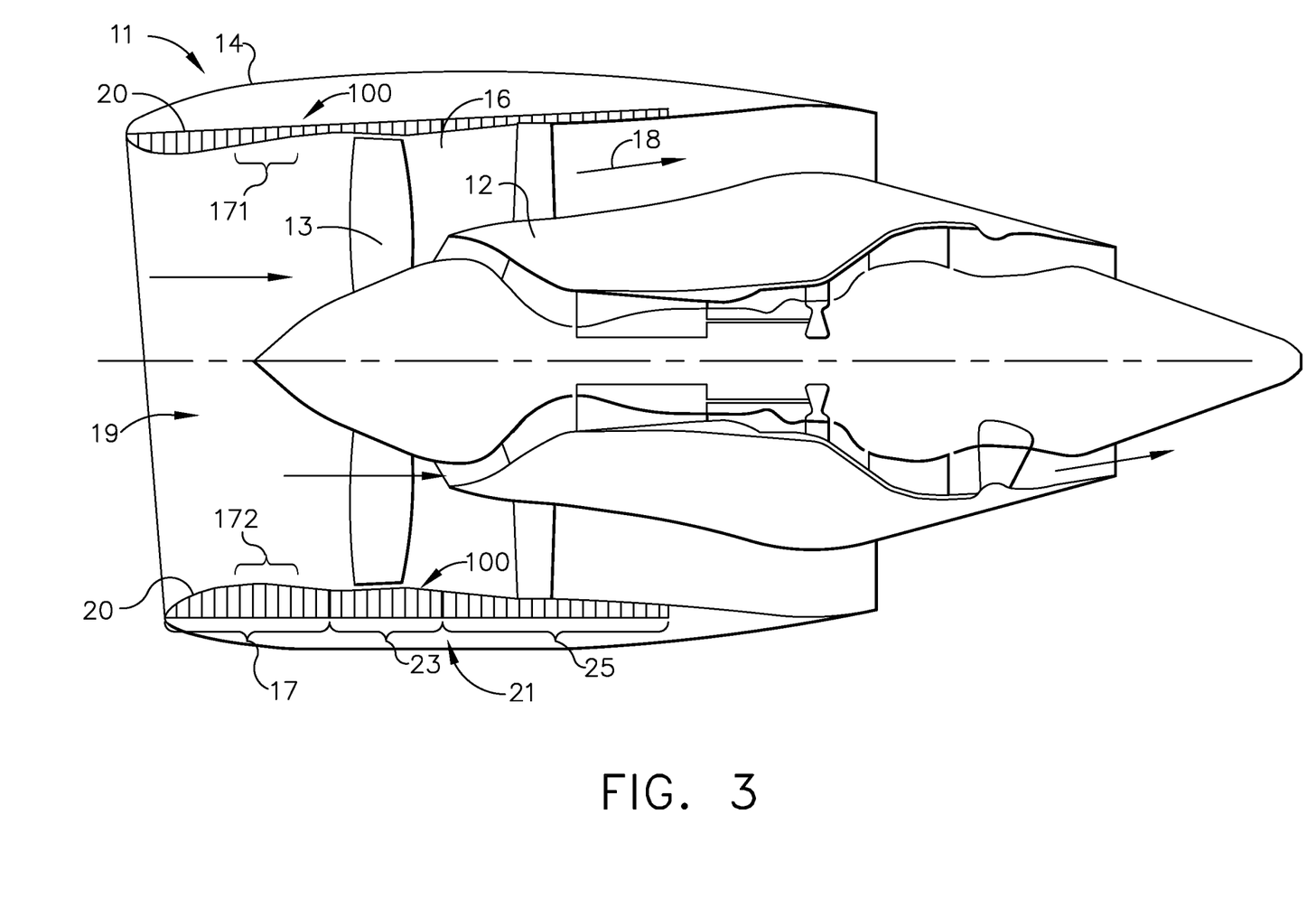
FIG. 3 is a schematic view of an aircraft engine assembly having an acoustic panel in accordance with various aspects described herein, with a portion of the outer nacelle cut away for clarity.

FIG. 3 illustrates an exemplary environment of an aircraft engine assembly 11 having a turbine engine 12, a fan assembly 13, and a nacelle 14. Portions of the nacelle 14 have been cut away for clarity. The nacelle 14 surrounds the turbine engine 12 and has an inlet section 17 that defines an inlet 19 open to ambient air and an annular airflow path or annular bypass duct 16 through the aircraft engine assembly 11 to define a generally forward-to-aft bypass airflow path as schematically illustrated by the arrow 18. The turbine engine 12 can have a fan section 21 that includes an annular fan case 23 and an aft duct 25 of a thrust reverser (not shown). The fan section 21 can be provided within the nacelle 14 wherein the fan section 21 is in fluid communication with the inlet 19. An annular acoustic panel or acoustic liner 100 can be provided within at least a portion of the nacelle 14. By way of non-limiting example, the acoustic liner has been illustrated at the inlet 19, fan case 23, and aft duct 25. The acoustic liner 100 is configured to attenuate noise in the aircraft engine assembly 11 and defines the through air flow.

Figure 4:
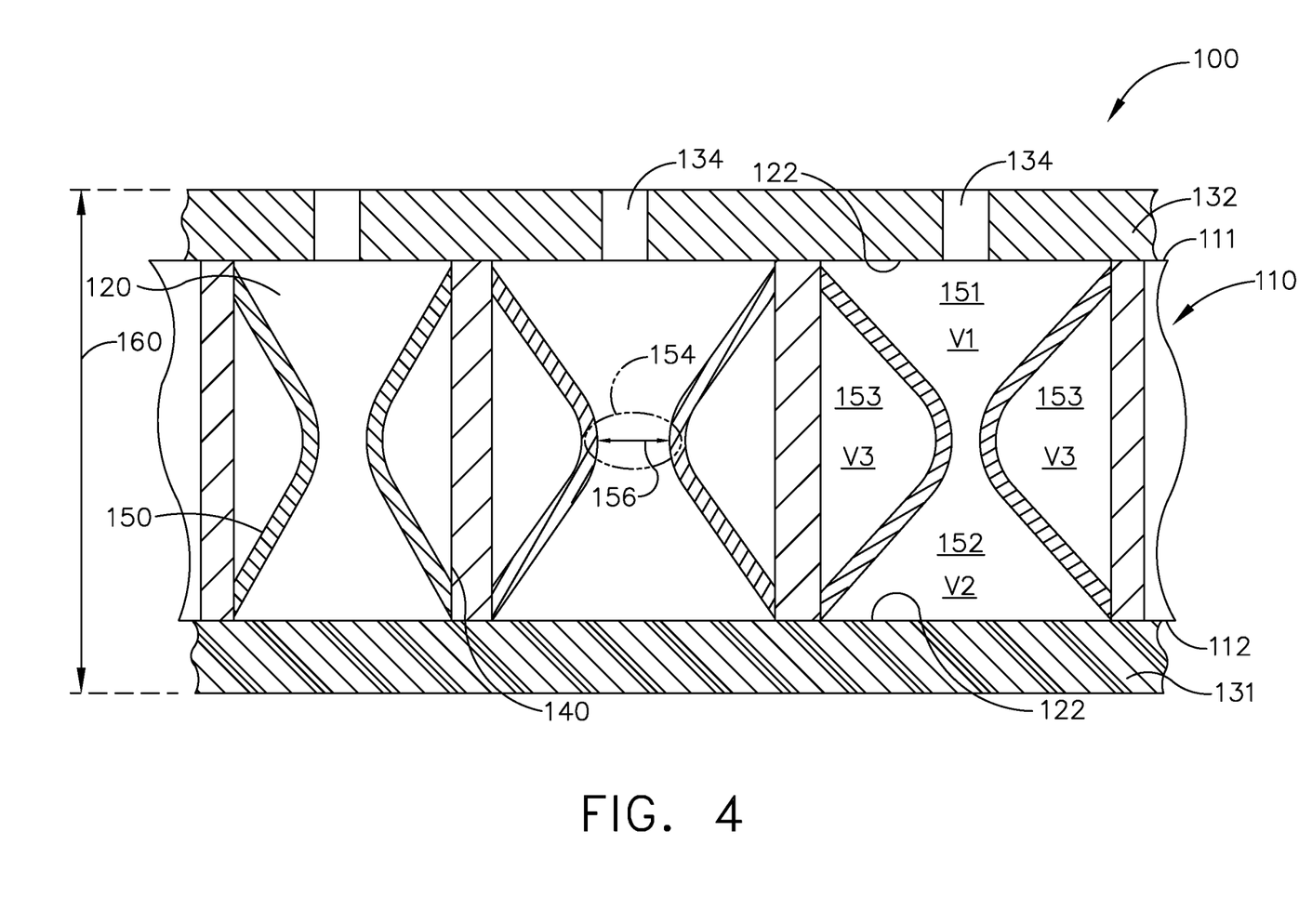
FIG. 4 is a side sectional view of the acoustic panel of FIG. 3 according to an exemplary first aspect.

In accordance with an aspect of the disclosure, FIG. 4 shows a cross-sectional view of a portion of the annular acoustic liner 100 of FIG. 3. A support layer 110 having a first side 111 and a second side 112 spaced from the first side 111 is included. The support layer 110 can include any suitable material including, but not limited to, aluminum, nomex, fiberglass, corrosion resistant steel, titanium, thermoplastic, or thermoset composites. A set of partitioned cavities 120 extends between the first side 111 and second side 112, and the cavities 120 can have open faces 122 on the first and second sides 111, 112 (shown in more detail in FIG. 5).

The partitioned cavities 120 can be formed by an open framework 140, such as a honeycomb-shaped framework disposed between the second facing sheet 132 and the first facing sheet 131. The partitioned cavities 120 can each have a predetermined volume defined by the geometry of the open framework 121 and the spacing between the second facing sheet 132 and the first facing sheet 131.

A first facing sheet 131 can be operably coupled to the support layer 110 such that the first facing sheet 131 overlies and closes the open faces 122 on the second side 112. A second facing sheet 132 can be operably coupled to the support layer 110, overlying the open faces 122 on the first side 111. A set of perforations 134 can be optionally included in the second facing sheet 132, where the perforations 134 are in fluid communication with the set of partitioned cavities 120. In the example of FIG. 4 it is contemplated that the set of perforations 134 can correlate with the set of cavities 120 such that a perforation 134 can be provided for every cavity 120 in the set as shown. Alternatively, multiple perforations 134 can fluidly couple each cavity 120. Further still, the number of perforations fluidly coupled to a cavity can differ.

A set of internal separator structures 150 can be included within at least some of the set of cavities 120. More specifically, a single internal separator structure 150 can be located within a single cavity 120 as shown. An internal separator structure 150 can be included in any number of the cavities 120, including that an internal separator structure 150 can be located in some or all of the cavities 120. The internal separator structure 150 can include a membrane, flexible mesh, or locally perforated material such that fluid such as air can move from one side of the internal separator structure to another. It is contemplated that the internal separator structures 150 can be formed integrally with the cavities 120, or that the internal separator structures 150 can be formed as separate inserts to be placed within the cavities 120 as illustrated in FIG. 4.

The internal separator structure 150 can have any suitable shape, profile, contour, or height, examples of which include a hemispherical shape, flat panel, or curved panel. For example, in FIG. 4 the internal separator structure 150 is illustrated as having an hourglass shape with open upper and lower portions. The exemplary internal separator structure 150 divides the cavity 120 into a plurality of fluid cavities, illustrated as a first fluid cavity 151 with a first volume V1, a second fluid cavity 152 with a second volume V2, and a third fluid cavity 153 with a third volume V3. A neck 154 having a width 156 can be defined at the narrowest point of the internal separator structure 150 having the exemplary hourglass profile as shown.

The cavities 120 can also form a portion of an acoustic resonator, such as a Helmholtz resonator as described above, with the neck 154 defining the neck portion and the second volume V2 defining the cavity volume. In a non-limiting example, the resonators can be tuned to attenuate predetermined frequencies associated with engine sounds entering the acoustic resonators, including by varying the width 156 of the neck 154, the relative sizes of the first volume V1 and the second volume V2, or the size of the third volume V3. In this manner tuning can be accomplished by expanding the size of the neck 154 or other portions of the internal separator structure 150 within the cavity 120. In this manner the separator structures 150 can be tuned to attenuate specific frequencies or broadband noise.

Acoustic frequencies present in the environment near the fan assembly 13 can vary from those farther away from the fan assembly 13, and physical aspects such as the width 156 of the neck 154, a ratio of the first volume V1 to the second volume V2, or a total thickness 160 of the acoustic liner 100, can be adjusted to attenuate various sound frequencies depending on where the acoustic liner 100 is placed. For the purposes of illustration, FIG. 3 illustrates a portion 171 of the acoustic liner 100 farther from the fan assembly 13 with a decreased total thickness 160 to attenuate sound frequencies in that region. Sound frequencies may also vary in the circumferential direction, and a second portion 172 (FIG. 3) of the acoustic liner 100 may have different sound attenuation requirements than the portion 171 even if both portions 171, 172 are positioned the same axial distance away from the fan 13. By way of illustration the portions 171, 172 can achieve different sound attenuation based on their differing total thickness 160, and it should be understood that the sound attenuation properties can also be achieved by other physical aspects such as the neck width 156 or volume ratio as described above.

Figure 5:
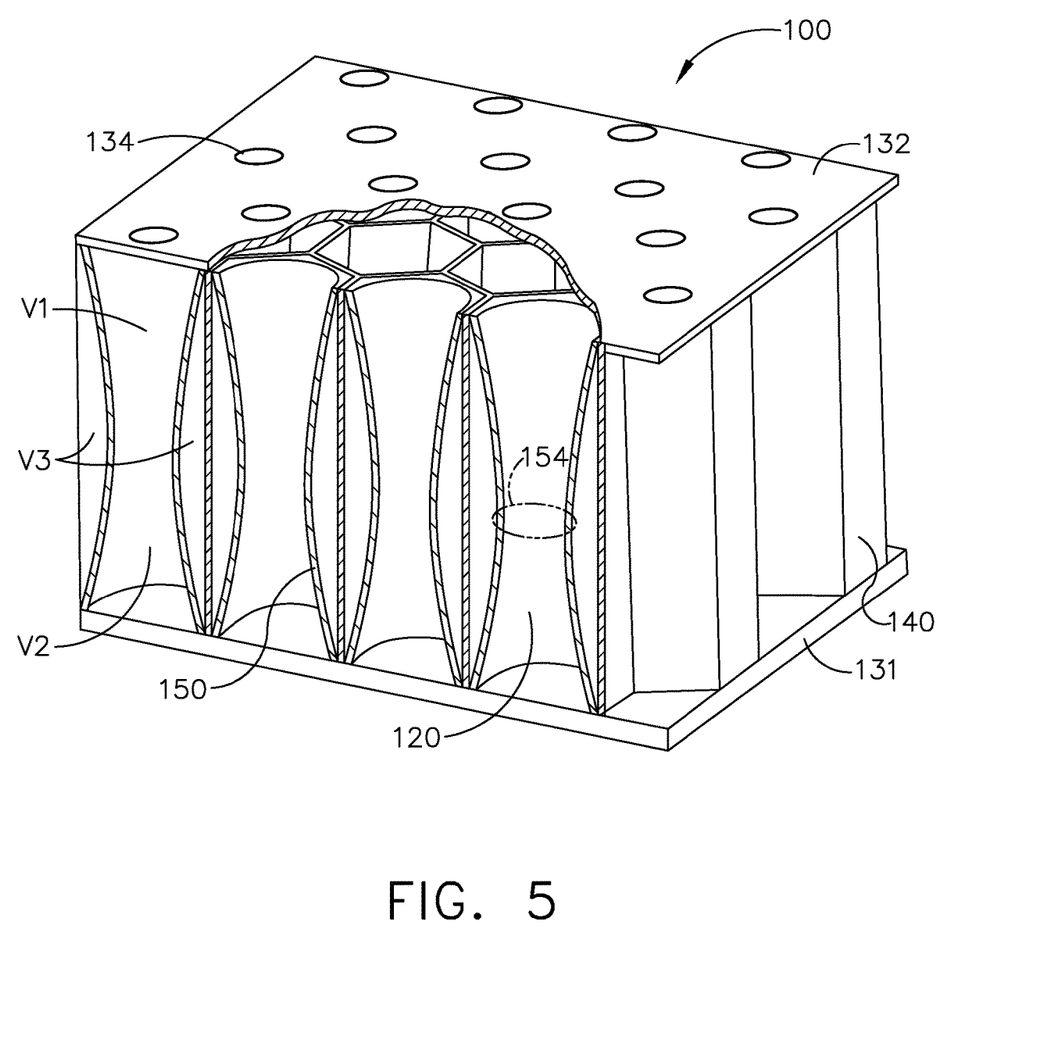
FIG. 5 is a perspective view of the acoustic panel of FIG. 4 with portions removed for clarity.

Referring now to FIG. 5, the partitioned cavities 120 are illustrated as having a honeycomb profile formed by the framework 140. The partitioned cavities 120 in the honeycomb profile can have six walls formed by the open framework 140, a bottom wall formed by the second facing sheet 132 and a top wall formed by the first facing sheet 131. Alternatively, the top can be open. It can be appreciated that the first and second volumes V1, V2 can be fluidly coupled by the neck 154, and the third volume V3 surrounds the hourglass-shaped internal separator structure 150. It is further contemplated that the third volume V3 can be fluidly coupled to the first or second volumes V1, V2 in an example where the internal separator structure 150 includes a perforated or mesh material, or where the internal separator structure 150 includes an open or discontinuous neck 154.

The set of perforations 134 can form inlets in a predetermined pattern to allow air into the cavities 120. In the example of FIG. 5 the perforations 134 are illustrated as having identical areas, spacing, and geometric profiles, although this need not be the case. Further, the set of perforations 134 are illustrated as having several perforations 134 over a given cavity 120. Again, any number of perforations 134 can fluidly couple to a cavity and that number need not be identical for every cavity. It will be understood that the perforations 134 can be varied in area, spacing, or geometric profiles including round, elliptical, rectangular, or irregular, in different zones of the perforated sheet as desired.

In operation, air flowing through the engine 11 (FIG. 3) can flow through the set of perforations 134 and enter selected cavities 120. The internal separator structures 150 can cause air inside the cavities 120 to resonate at a preselected frequency based on the customized shape of the resonance cavity 172, while other sound frequencies outside of the preselected frequency cannot resonate and are therefore attenuated. Where the entire cavity volume forms a single resonance cavity in the exemplary prior art panel of FIG. 1, the divided cavity volumes V1, V2, V3 of the cavity 120 can be adjusted by varying the position of the internal separator structure 150. In this manner the internal separator structures 150 can provide for geometric variance of the inside of the cavities 120 and provide additional air cavities to absorb sound waves, and therefore improve the ability to attenuate particular sound frequencies.

Figure 6:
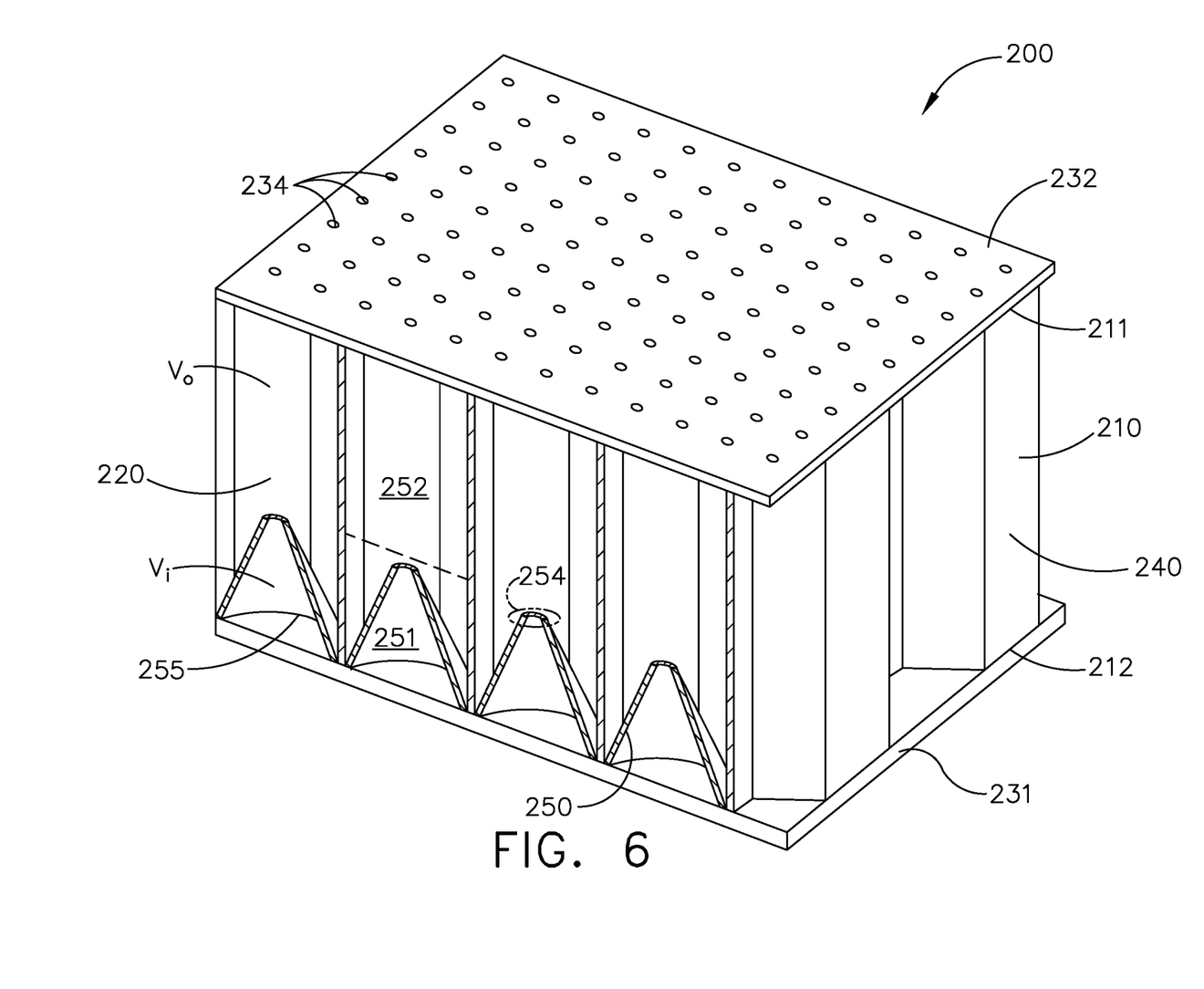
FIG. 6 is a perspective view of the acoustic panel of FIG. 3 according to an exemplary second aspect with portions removed for clarity.

Turning to FIG. 6, the turbine engine 11 can include another acoustic panel 200 in addition to or as an alternative to the acoustic panel 100. The acoustic panel 200 is similar to the acoustic panel 100, therefore, like parts will be identified with like numerals increased by 100, with it being understood that the description of the like parts of the first aspect applies to the second aspect, unless otherwise noted.

The acoustic panel 200 includes a first facing sheet 231, second facing sheet 232 with a set of perforations 234, as well as a set of partitioned cavities 220 formed in a support layer 210. The support layer 210 includes a first side 211 and second side 212, and also forms an internal framework 240 extending between the first and second facing sheets 231, 232 as shown. A set of internal separator structures 250 can be included within at least some of the set of cavities 220. More specifically, a single internal separator structure 250 can be located within a single cavity 220 and any number of the cavities 220 can include internal separator structures 250.

One difference is that the internal separator structure 250 is illustrated in FIG. 6 as having a frusto-conical shape or profile, such as a truncated cone with an open top. In this manner, the alternative internal separator structure 250 divides the cavity 220 into an inner fluid cavity 251 with an inner volume Vi and an outer fluid cavity 252 with an outer volume Vo. A base 255 of the internal separator structure 250 can be positioned adjacent a second side 212 of the support layer 210, intersecting at least one wall of the cavities 220 as shown. It will be understood that the first facing sheet 231 can be positioned adjacent a second side 212 of a support layer 210 formed by the framework 240, similar to that described in FIG. 4.

The partitioned cavities 220 can have a honeycomb profile with six walls formed by an open framework 240, a bottom wall formed by the second facing sheet 232 and a top wall formed by the first facing sheet 231. It can be appreciated that the inner and outer volumes Vi, Vo can be fluidly coupled by the opening 254, and the outer volume Vo surrounds the frusto-conical shaped internal separator structure 250. It is further contemplated that the outer volume Vo can be fluidly coupled to the inner volume Vi in an example where the internal separator structure 250 includes a perforated or mesh material.

Figure 7:
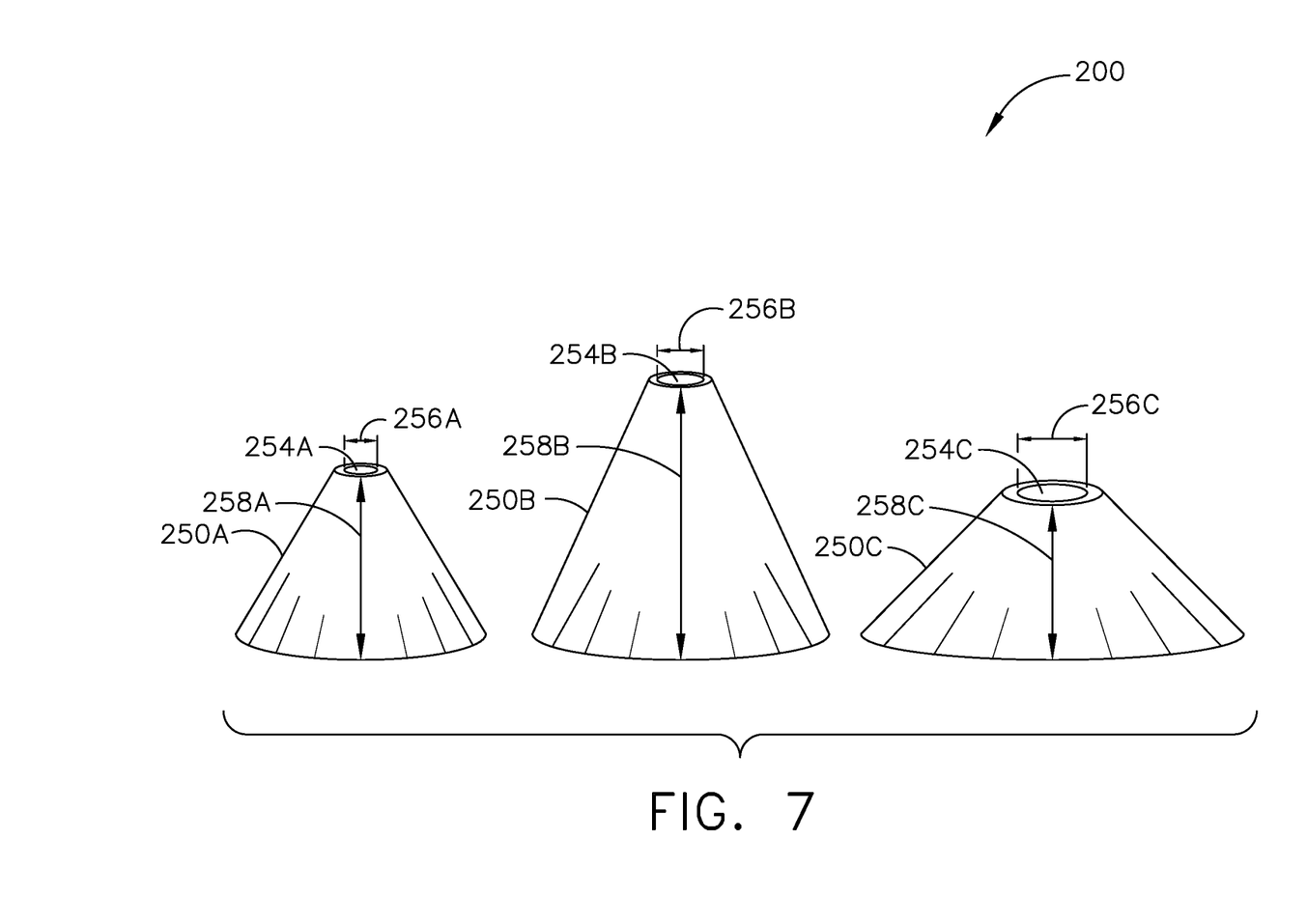
FIG. 7 illustrates an internal separator structure of the acoustic panel of FIG. 6.

Referring now to FIG. 7, the frusto-conical internal separator structure is illustrated in three configurations. A first structure 250A can have a first opening 254A with a diameter 256, as well as first height 258A. A second structure 250B can have a opening 254B with a second diameter 256B, and also a second height 258B which can be greater than the first height 258A. A third structure 250C can have a third opening 254C with a third diameter 256C which is greater than the first opening 256A, as well as a third height 258C smaller than the first height 258A.

It will be understood that the internal separator structures 250 utilized in the cavities 220 (FIG. 6) can all have equal heights or opening diameters, or that heights and opening diameters can vary in a pre-determined pattern in the acoustic panel 200 as desired.

As described above, the cavities 220 can form acoustic resonators that can be tuned to attenuate various sound frequencies including broadband noise. The cavities 220 can also form a portion of an acoustic resonator, such as a Helmholtz resonator as described above, with the opening 256 defining the neck portion and the inner volume Vi defining the cavity volume. Tuning can be accomplished by varying the opening diameter 258 or height 254 of the internal separator structure 250; as before, the cells 220 can be more precisely tuned by the internal separator structures 250 compared with prior art acoustic panels. It is further contemplated that at least one cavity 220 can be empty with no internal separator structures included; in this manner, a pattern of cells containing internal separator structures and cells containing no internal separator structures can be used to tune the acoustic panel for noise attenuation.

Figure 8:
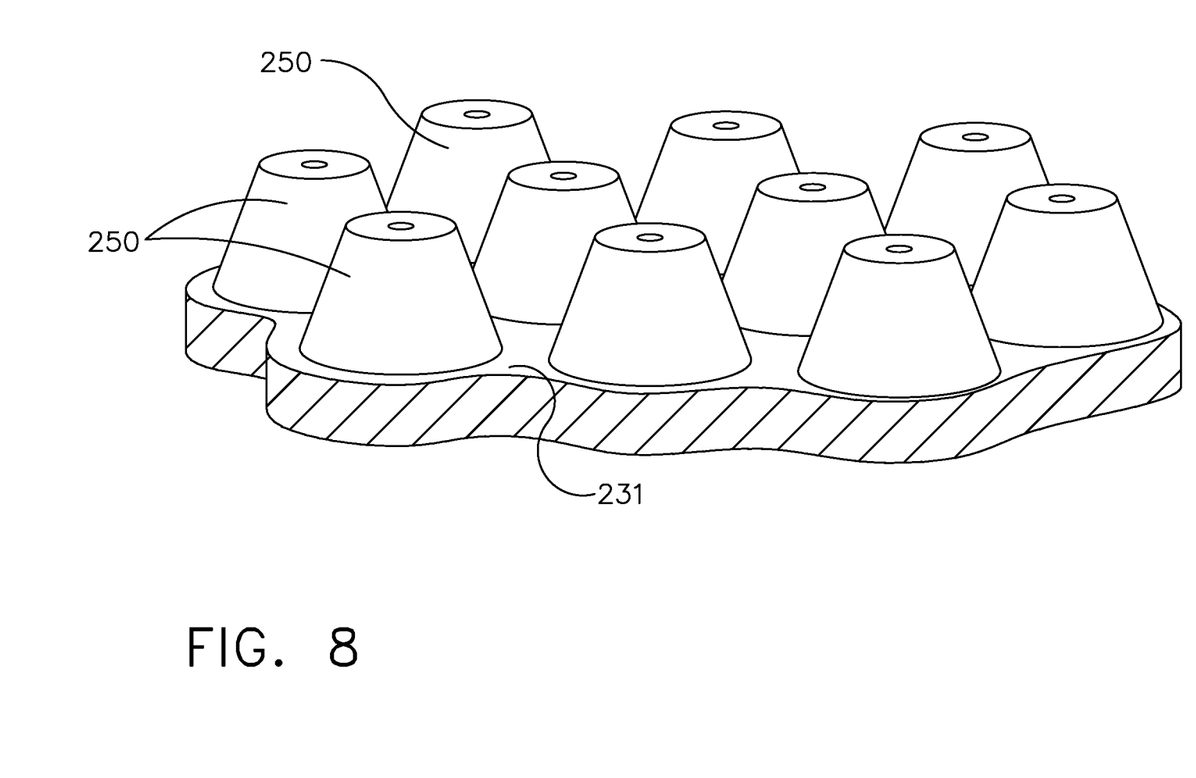
FIG. 8 illustrates an internal separator structure which can be utilized in the acoustic panel of FIG. 6.

Aspects illustrated above show that the internal separator structures can be manufactured in single configurations to be installed into single honeycomb cells, including cells with other geometries including cylindrical or rectangular. Referring now to FIG. 8, it is also contemplated that the internal separator structures 250 can be manufactured in multiple cell groups and integrally formed with the first facing sheet 231. The grouped separator structures can also vary in geometry from cell to cell, or from one nacelle area to another, where combinations of frusto-conical, hourglass, or other separator profiles can be utilized in a given grouping. Additionally, the internal separator structure can be manufactured from the same materials as the open layer cell including, but not limited to, aluminum, nomex, fiberglass, corrosion-resistant steel, titanium, thermoplastic, or thermoset composites, and the separator can be formed in a cell during the cell manufacturing process.

Alternatively, the internal separator structures can be manufactured using a separate process from the cell manufacturing process and inserted into the open support layer cells. It is contemplated that the separator may be manufactured utilizing existing production processes such as press forming, injection or other molding techniques, thermal drape forming, or additive manufacturing.

Figure 9:
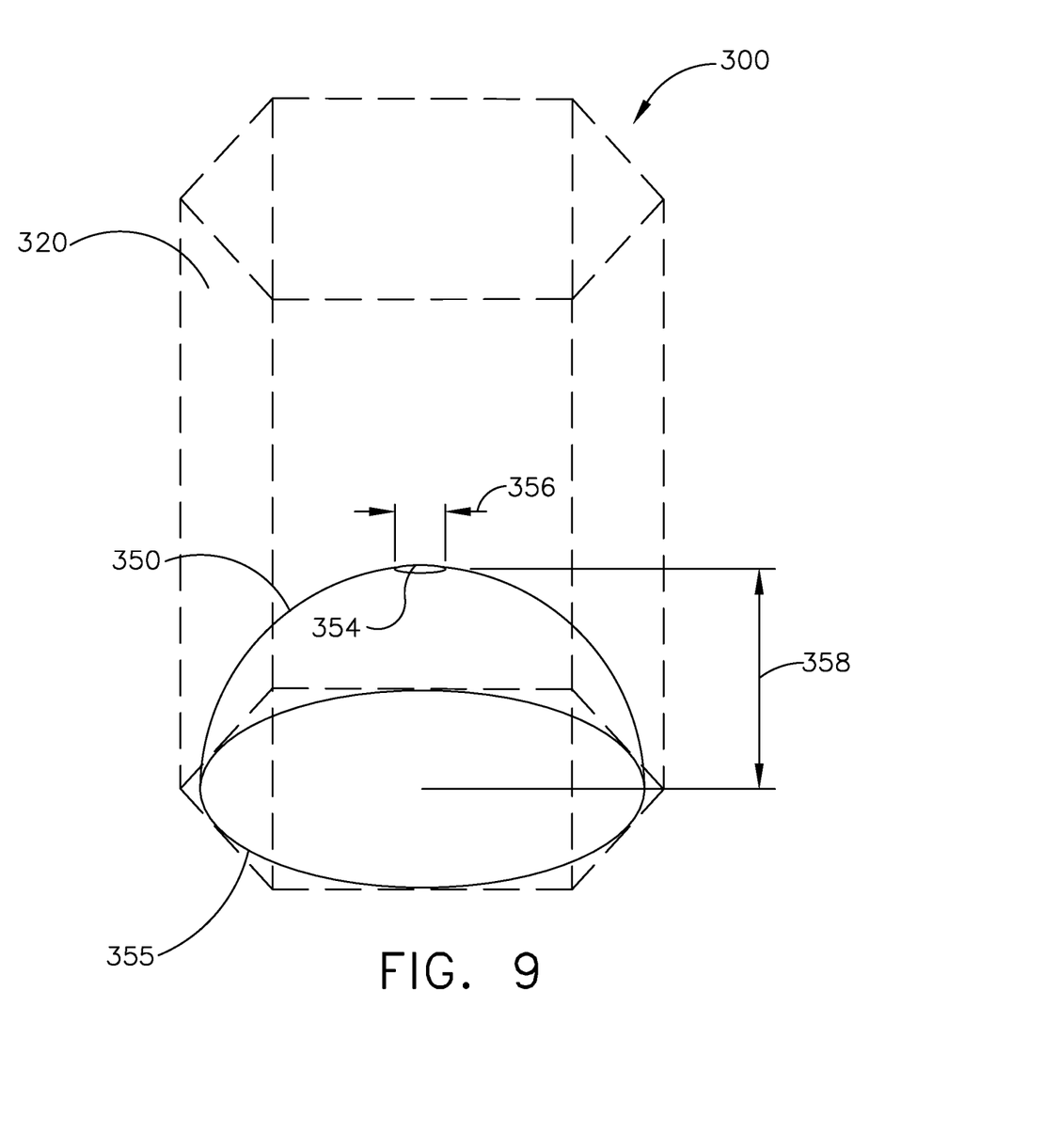
FIG. 9 illustrates the acoustic panel of FIG. 3 according to an exemplary third aspect.

FIG. 9 illustrates that the turbine engine 11 can include another acoustic panel 300 in addition to or as an alternative to the acoustic panel 200. The acoustic panel 300 is similar to the acoustic panel 200, therefore, like parts will be identified with like numerals further increased by 100, with it being understood that the description of the like parts of the first aspect applies to the second aspect, unless otherwise noted.

The acoustic panel 300 can include a set of partitioned cavities 320 which are illustrated as having a honeycomb or hexagonal shape. An internal separator structure 350 having a hemispherical shape or profile can be positioned within a cavity 320 as shown. The separator structure 350 can include a top opening 354 having a diameter 356, and can also include a height 358 which is also a radius of curvature for the hemispherical separator structure 350. As described above, the separator structure 350 can divide the cavity into at least two volumes and can comprise a perforated or mesh material as desired. Furthermore, a base 355 of the internal separator structure 350 can be positioned to intersect at least one wall of the cavity 220 as shown.

It can be appreciated that the acoustic panels described herein can include internal separator structures that can have any desired profile or shape, such that the volume of a partitioned cavity within the acoustic panel can be subdivided into any desired number of subvolumes. While illustrated with hourglass, frusto-conical, and hemispherical profiles, it should be understood that a number of profiles, shapes, or variations can be utilized for the separator structures in the spirit of the present disclosure.

Figure 10:
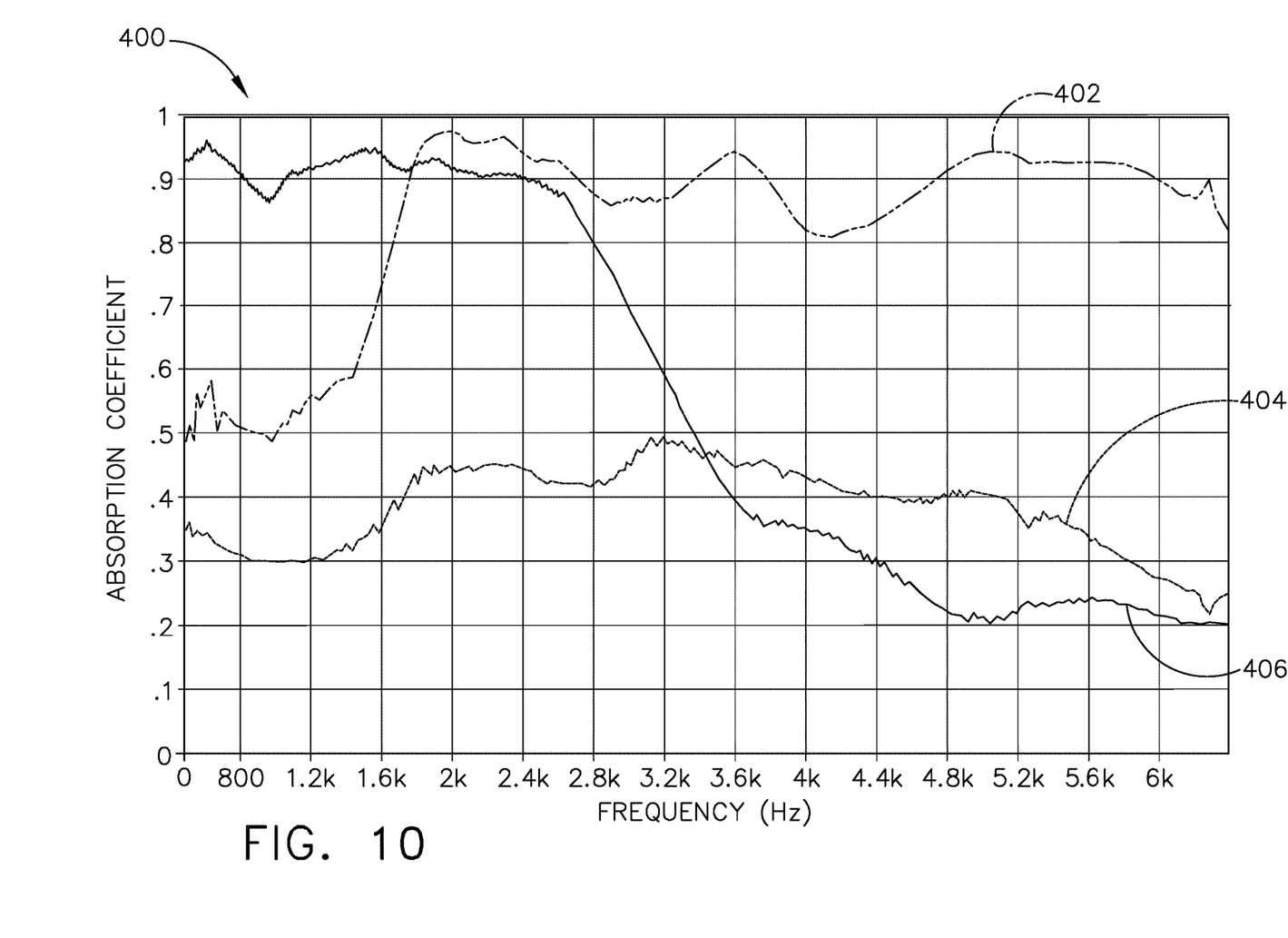
FIG. 10 illustrates a plot of absorption coefficient as a function of frequency for the acoustic panels of FIG. 4 and FIG. 6.

Turning to FIG. 10, a plot 400 illustrates a function of absorption coefficient as a function of sound frequency. The absorption coefficient of an acoustic panel can be defined in equation (1) as $$1 - \frac{\text{reflected sound intensity}}{\text{incident sound intensity}} \qquad (1)$$

which relates to an amount of sound attenuation, where 0.0 correlates with 0% attenuation and 1.0 correlates with 100% attenuation. An hourglass plot 402 indicates one example of the sound attenuation provided by the acoustic panel 100 having the hourglass-shaped internal separator structure 150. A conical plot 404 indicates one example of the sound attenuation provided by the acoustic panel 200 having the frusto-conical shaped internal separator structure 250, and a conventional plot 406 indicates one example of the sound attenuation provided by the prior art panel 2 illustrating a conventional acoustic liner. It can be seen that the conventional plot 406 has a high absorption level (above 85%) up to approximately 2.8 kHz, and the absorption quickly drops off at higher frequencies. The hourglass plot 402 illustrates a high (above 80%) level of absorption for frequencies of approximately 1.6 kHz and above, and the conical plot 404 illustrates a lower, but less variable, level of absorption of approximately 40% across the entire frequency spectrum shown. It can also be seen that for frequencies above approximately 3.6 kHz, the hourglass plot 402 and conical plot 404 both have higher absorption levels than the conventional plot 406.

Defining "steady" as referring to an absorption coefficient fluctuating by up to 0.2, or 20% in attenuation, and defining "effective" as referring to an absorption coefficient greater than 0.3, or 30% attenuation, it can be seen in the examples illustrated that:

The absorption coefficient for the hourglass plot 402 is steady and effective for frequencies of approximately 1.7-6.4 kHz.

The absorption coefficient for the conical plot 404 is steady and effective for frequencies of approximately 0.0-5.8 kHz.

The absorption coefficient for the conventional plot 406 is steady and effective for frequencies of approximately 0.0-2.8 kHz.

It can therefore be appreciated that the internal separator structures 150, 250 provide for an improved sound attenuation performance, having a greater frequency range with a steady and effective absorption coefficient compared with conventional acoustic panels. It can also be appreciated that the above-described internal separator structures or alternate internal separator structures can be combined into a single acoustic panel to provide a varying degree of absorption. In non-limiting examples, a single acoustic panel can include an internal separator structure including, but not limited to, an hourglass-shaped and frusto-conical-shaped internal separator structure in adjacent cells as desired, or a single acoustic panel can include combinations of traditional cells without internal separator structures with cells containing hourglass and frusto-conical internal separator structures, such as alternating between differing types of cells in a pre-determined pattern.

The aspects of the disclosure described above provide for a variety of benefits including that the proposed acoustic panels have a more linear sound attenuation profile compared to those of conventional acoustic panels, and therefore are more efficient in attenuating a wider range of frequencies. The separators can be readily tuned by geometric modifications to better attenuate different frequencies. The disclosure proposes a new method of attenuating multiple frequencies in a commercial environment where the number of available solutions is limited. In addition, the separators described herein can be readily applied to existing core geometries which can reduce manufacturing costs.

To the extent not already described, the different features and structures of the various embodiments may be used in combination with each other as desired. That one feature may not be illustrated in all of the embodiments and is not meant to be construed that it may not be, but is done for brevity of description. Thus, the various features of the different embodiments may be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An acoustic liner, comprising:
    a support layer having a first side and a spaced second side and where the support layer includes a set of partitioned cavities extending between the first side and the second side, defining a set of cells, and where the set of partitioned cavities have open faces;
    a first facing sheet operably coupled to the support layer such that the first facing sheet overlies and closes the open faces on the second side; and
    a set of internal separator structures within at least some of the set of partitioned cavities, where a single internal separator structure is located within a single cavity of the set of partitioned cavities and the single internal separator structure includes an hourglass shaped internal separator structure dividing the single cavity into three fluid cavities, the three fluid cavities include first and second fluid cavities inside of the hourglass shaped internal separator, and a third fluid cavity outside of the hourglass shaped internal separator.

2. The acoustic liner of claim 1, further comprising a second facing sheet operably coupled to the support layer such that the second facing sheet overlies the open faces on the first side, with a set of perforations included in the second facing sheet.

3. The acoustic liner of claim 1 wherein the support layer includes a honeycomb core.

4. The acoustic liner of claim 1 wherein the set of internal separator structures are integrally formed with the support layer.

5. The acoustic liner of claim 1 wherein at least two of the three fluid cavities are fluidly coupled with each other.

6. The acoustic liner of claim 5 wherein a first fluid cavity and a second fluid cavity of the three fluid cavities are fluidly coupled via a neck of the hourglass shaped internal separator structure and at least one of the first fluid cavity and the second fluid cavity are fluidly coupled with a third fluid cavity of the three fluid cavities.

7. An acoustic liner, comprising:
    a support layer having a first side and a spaced second side and where the support layer includes a set of partitioned cavities extending between the first side and the second side, defining a set of cells, and where the set of partitioned cavities have open faces;
    a first facing sheet operably coupled to the support layer such that the first facing sheet overlies and closes the open faces on the second side; and
    a set of internal separator structures within at least some of the set of partitioned cavities, where a single internal separator structure is located within a single cavity of the set of partitioned cavities and the single internal separator structure includes a hemispherical shaped internal separator dividing the single cavity into two fluid cavities,
    wherein a base of the hemispherical shaped internal separator is adjacent the second side of the support layer, and a height of the hemispherical shaped internal separator above the base of the hemispherical shaped internal separator equals a radius of curvature of the hemispherical shaped internal separator.

8. The acoustic liner of claim 7 wherein a top of the hemispherical shaped internal separator includes a circular opening.

9. The acoustic liner of claim 7 wherein the base of the hemispherical shaped internal separator intersects at least one wall of the single cavity.

10. An aircraft engine assembly, comprising:
    a nacelle configured to surround an aircraft engine and having an inlet section that defines an inlet open to ambient air and where the nacelle at least partially defines an annular airflow path through the aircraft engine assembly; and an acoustic panel operably coupled to at least one of the aircraft engine or the nacelle, the acoustic panel comprising:
a support layer having a first side and a spaced second side and where the support layer includes a set of partitioned cavities extending between the first side and the second side, defining a set of cells, and where the set of partitioned cavities have open faces;
a first facing sheet operably coupled to the support layer such that the first facing sheet overlies and closes the open faces on the second side; and
a set of internal separator structures within at least some of the set of partitioned cavities, where a single internal separator structure is located within a single cavity of the set of partitioned cavities and the single internal separator structure includes an hourglass shaped internal separator structure dividing the single cavity into three fluid cavities, the three fluid cavities include first and second fluid cavities inside of the hourglass shaped internal separator, and a third fluid cavity outside of the hourglass shaped internal separator.

11. The aircraft engine assembly of claim 10, further comprising a second facing sheet operably coupled to the support layer such that the second facing sheet overlies the open faces on the first side, with a set of perforations included in the second facing sheet and at least one perforation of the set of perforations fluidly coupled with the single cavity.

12. The aircraft engine assembly of claim 10 wherein the set of internal separator structures are integrally formed with the support layer.

13. An aircraft engine assembly, comprising:
a nacelle configured to surround an aircraft engine and having an inlet section that defines an inlet open to ambient air and where the nacelle at least partially defines an annular airflow path through the aircraft engine assembly; and
an acoustic panel operably coupled to at least one of the aircraft engine or the nacelle, the acoustic panel comprising:
a support layer having a first side and a spaced second side and where the support layer includes a set of partitioned cavities extending between the first side and the second side, defining a set of cells, and where the set of partitioned cavities have open faces;
a first facing sheet operably coupled to the support layer such that the first facing sheet overlies and closes the open faces on the second side; and
a set of internal separator structures within at least some of the set of partitioned cavities, where a single internal separator structure is located within a single cavity of the set of partitioned cavities and the single internal separator structure includes a hemispherical shaped internal separator dividing the single cavity into two fluid cavities,
wherein a base of the hemispherical shaped internal separator is adjacent the second side of the support layer, and a height of the hemispherical shaped internal separator above the base of the hemispherical shaped internal separator equals a radius of curvature of the hemispherical shaped internal separator.

14. The aircraft engine assembly of claim 13 wherein a top of the hemispherical shaped internal separator includes a circular opening.

15. A method of forming a portion of an acoustic liner, comprising:
forming a support layer having a first side and a spaced second side and where the support layer includes a set of partitioned cavities extending between the first side and the second side, defining a set of cells, and where the set of partitioned cavities have open faces;
separating at least one cavity of the set of partitioned cavities into a plurality of volumes that are fluidly coupled via an internal separator structure within the at least one cavity, the internal separator structure including an hourglass shaped internal separator structure dividing the single cavity into three fluid cavities, the three fluid cavities include first and second fluid cavities inside of the hourglass shaped internal separator, and a third fluid cavity outside of the hourglass shaped internal separator; and
operably coupling a facing sheet to the second side of the support layer such that the facing sheet overlies and closes the open faces on the second side.

16. The method of claim 15 wherein separating the at least one cavity comprises locating an internal separator structure within the at least one cavity.

17. The method of claim 15 wherein locating the internal separator structure includes tuning to attenuate specific frequencies by expanding the internal separator structure within the at least one cavity.

18. The method of claim 15 wherein separating the at least one cavity includes additively manufacturing or molding the internal separator structure with the support layer.

19. The method of claim 15, further comprising operably coupling a perforated facing sheet to a first side of the support layer such that the facing sheet overlies the open faces on first side and at least one perforation of the perforated facing sheet is fluidly coupled to a cavity of the set of partitioned cavities.

20. A method of forming a portion of an acoustic liner, comprising:
forming a support layer having a first side and a spaced second side and where the support layer includes a set of partitioned cavities extending between the first side and the second side, defining a set of cells, and where the set of partitioned cavities have open faces;
separating at least one cavity of the set of partitioned cavities into a plurality of volumes that are fluidly coupled via an internal separator structure within the at least one cavity, the internal separator structure including a hemispherical shaped internal separator dividing the single cavity into two fluid cavities, a base of the hemispherical shaped internal separator being adjacent the second side of the support layer, and a height of the hemispherical shaped internal separator above the base of the hemispherical shaped internal separator being equal to a radius of curvature of the hemispherical shaped internal separator; and
operably coupling a facing sheet to the second side of the support layer such that the facing sheet overlies and closes the open faces on the second side.

* * * * *